C. A. LEDELL.
SCREW GAUGE.
APPLICATION FILED NOV. 16, 1921.

1,423,339.

Patented July 18, 1922.

Inventor
CARL A. LEDELL,

By Hood & Schley
Attorneys

UNITED STATES PATENT OFFICE.

CARL ASTOR LEDELL, OF CONNERSVILLE, INDIANA.

SCREW GAUGE.

1,423,339.

Specification of Letters Patent.   Patented July 18, 1922.

Application filed November 16, 1921.   Serial No. 515,488.

*To all whom it may concern:*

Be it known that I, CARL A. LEDELL, a citizen of the United States, residing at Connersville, in the county of Fayette and State of Indiana, have invented a new and useful Screw Gauge, of which the following is a specification.

The object of my invention is to produce an efficient device by means of which screw threads may be accurately gauged.

Figure 1:
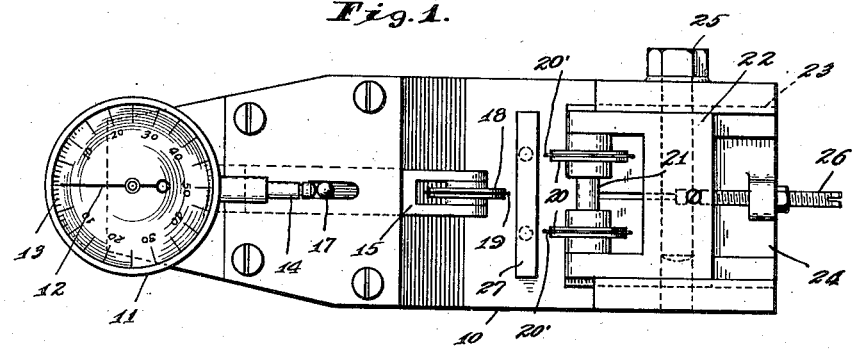
Figure 2:
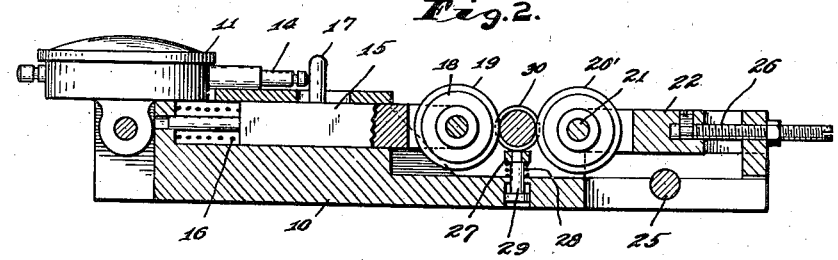
Figure 3:
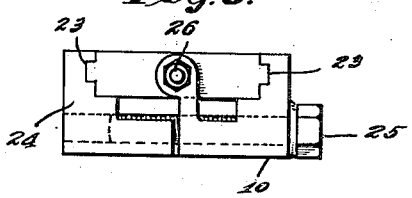
Figure 4:
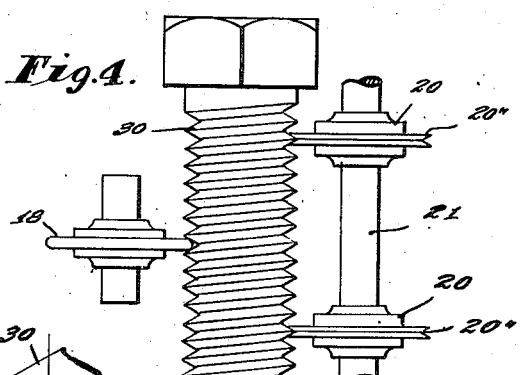
Figure 5:
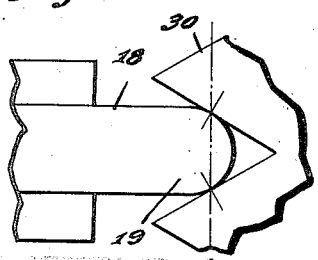

The accompanying drawings illustrate my invention; Fig. 1 is a plan of the instrument; Fig. 2, a side elevation in partial longitudinal vertical section; Fig. 3, an end elevation; Fig. 4, a diagram showing a threaded bolt and a slightly modified form of rollers of my instrument; and Fig. 5, a fragmentary diagram showing the peculiar form of the gauge roller and its co-action with a threaded member at the proper pitch line.

In the drawings, 10 indicates a main body carrying at one end an ordinary dial type of micrometer gage 11, having an indicator arm 12, graduated dial 13 and spring pressed plunger 14 which provides means for the manipulation of the arm 12. As is customary in this type of construction, the graduated dial 13 is relatively rotatable on the body of the gauge so that the zero of the dial may be placed at any desired point. Slidably mounted in body 10 parallel with plunger 14 is a plunger 15 which is normally urged outwardly by spring 16 and is provided with a finger 17 projected into the path of movement of plunger 14.

Plunger 15 carries a roller 18 which is provided with a circumferential portion 19 properly formed to co-act with the threads of the threaded member. I prefer to form the portion 19 as a circumferential flange having an active circumferential face of such form as to contact with the threads of a threaded member at the pitch line of the threads. This can, I think, be most conveniently accomplished by giving the outer face of the flange 19 a semi-circular cross section of such radius that it will contact with the faces of a thread of given pitch at the pitch line. As a consequence, for the most efficient operation of my tool, there will be provided a plurality of rollers 18, each one having a circumferential flange 19 properly proportioned to co-act with a thread of a given pitch. It will be readily understood, of course, that there may be a considerable variation in the shape of flange 19 all providing a proper contacting with the threads at the pitch line.

Opposing roller 18 are two rollers 20, 20 each of which is provided with a circumferential face adapted to co-operate with the threads of the member to be measured. These rollers 20 may correspond in form with the roller 18 and have circumferential flanges 20' or, as shown in Fig. 4, they may have circumferential flanges 20" which are circumferentially grooved to co-act with the tops of the threads of the member to be measured.

The rollers 20 are rotatably and slidably mounted upon a shaft 21 arranged parallel with the axis of roller 18 and preferably carried by a sliding carriage 22 mounted in suitable guideways 23 in the main body. In the drawings, I have shown one of these guideways as being carried by a clamping jaw 24 into which is threaded a clamping screw 25 projected through the body 10 so that, after adjustment of the carriage 22, it may be firmly clamped in adjusted position. Adjustment of the carriage 22 may be obtained by a suitable adjusting screw 26 operating in an upwardly extending arm on the rear end of the main body 10. The front end of this screw engages the rear end of the sliding carriage 22 so that by adjusting the screw the position of the carriage 22 may be adjusted.

In order to hold the threaded member to be measured parallel with the axes of the rollers 18 and 20, I provide a platform 27 which is conveniently spring pressed upwardly by spring 28 and guided for parallel motion by guide pins 29.

In use, a standard threaded element 30, corresponding to the elements to be measured is placed upon platform 27, the proper rollers 18 and 20, corresponding to the pitch of said element 30, are selected and placed in position and carriage 22 is adjusted to approximately the desired position. The element 30 is then placed upon table 27 and pressed downwardly until its axis comes in the plane of the axes of rollers 18 and 20, thus causing a movement of plungers 15 and 14 and finger 12. The graduated dial 13 is then turned until its zero comes into line with the finger 12.

Corresponding threaded elements to be gauged are then presented to the instrument. Rollers 20, being axially movable upon the shaft 21, come readily into co-active position with each threaded element as it is presented and the operator has merely to present the threaded element properly to the roller 18. As the member to be gauged is pressed downward between the two sets of rollers a reading will be obtained on dial 13 which will accurately indicate the pitch size of the threaded element. By having the thread engaging elements in the form of circumferential flanges on rollers 18 and 20, there is practically no slippage between the threaded element which is being gauged and the gauging surfaces of flanges 19 and 20', as would be the case where there was a slippage between such elements and consequently the unavoidable wear on the instrument is transferred to a point where it may be readily compensated by an adjustment of the dial 13.

I claim as my invention:

1. A thread measuring instrument comprising a main body, a roller provided with a circumferential portion formed to coact with the threads of the threaded element, means for yieldingly urging said roller transversely of its axis, an indicator, intermediate connections between the indicator and the roller to indicate variation of lateral position of the roller, and an abutment for the threaded member arranged in opposition to said roller.

2. A thread measuring instrument comprising a main body, a yielding measuring unit and a relatively stationary unit, and an indicator, said yielding unit being connected with the indicator, one of said units having a roller formed to co-act with the threads of the thread element and the other unit having a pair of rollers axially relatively movable and having a circumferential portion formed to co-act with the threads of the threaded unit.

3. A thread measuring instrument comprising a main body, a roller provided with a circumferential portion formed to co-act with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, relatively axially movable, each having a circumferential portion formed to contact with the threads of the element to be gauged.

4. A thread measuring instrument comprising a main body, a roller provided with a circumferential portion formed to co-act with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, each having a circumferential portion formed to contact with the threads of the element to be gauged.

5. A thread measuring instrument comprising a main body, a roller provided with a circumferential portion formed to coact with the threads of the threaded element at the pitch line of such threads, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, relatively axially movable, each having a circumferential portion formed to contact with the threads of the element to be gauged.

6. A thread measuring instrument comprising a main body, a roller provided with a circumferential portion formed to coact with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, relatively axially movable, each having a circumferential portion formed to contact with the threads of the element to be gauged, a slidable carriage supporting said rollers, and mean for holding said carriage in various positions of adjustment.

7. A thread measuring instrument comprising a main body, a roller provided with a circumferential portion formed to coact with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, each having a circumferential portion formed to contact with the threads of the element to be gauged, a slidable carriage supporting said rollers and means for holding said carriage in various positions of adjustment.

8. A thread measuring instrument comprising a main body, a roller provided with a circumferential portion formed to coact with the threads of the threaded element, means for yieldingly urging said roller transversely of its axis, an indicator, intermediate connections between the indicator and the roller to indicate variation of lateral position of the roller, and an abutment for the threaded member arranged in opposition to said roller, a platform arranged between the gauge roller and its opposing gauge member, and laterally movable toward and from the plane of movement of the gauge roller.

9. A thread measuring instrument comprising a main body, an indicator, a movable unit connected to said indicator and a relatively stationary abutment unit, one of said units comprising a roller having the circumferential portion thereof arranged to coact with the threads of the threaded element and the other of said units comprising a pair of rollers having the circumferential portion thereof arranged to co-act with the threads of the threaded element, and a roller on one of said units being movable axially.

10. A thread measuring instrument comprising a main body, a roller provided with a circumferential portion formed to co-act with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, relatively axially movable, each having a circumferential portion formed to contact with the threads of the element to be gauged, a platform arranged between the gauge roller and its opposing gauge member, and laterally movable toward and from the plane of movement of the gauge roller.

11. A thread measuring instrument comprising a main body, a roller provided with a circumferential portion formed to coact with the threads of the threaded element, means for yieldingly urging said roller transversely of its axis, an indicator, intermediate connections between the indicator and the roller to indicate variation of lateral position of the roller, and an abutment for the threaded member arranged in opposition to said roller said abutment comprising a pair of rollers, each having a circumferential portion formed to contact with the threads of the element to be gauged, a platform arranged between the gauge roller and its opposing gauge member, and laterally movable toward and from the plane of movement of the gauge roller.

In witness whereof, I, CARL A. LEDELL have hereunto set my hand at Connersville, Indiana, this 10th day of November, A. D. one thousand nine hundred and twenty-one.

CARL ASTOR LEDELL.